US012668662B2

(12) United States Patent
Mori et al.

(10) Patent No.: US 12,668,662 B2
(45) Date of Patent: Jun. 30, 2026

(54) METHOD FOR PRODUCING MALEIMIDE POLYETHYLENE GLYCOL LIPID

(71) Applicant: NOF CORPORATION, Shibuya-ku (JP)

(72) Inventors: Shota Mori, Ebina (JP); Masaki Ota, Ota-ku (JP)

(73) Assignee: NOF CORPORATION, Shibuya-ku (JP)

( * ) Notice: Subject to any disclaimer, the term of this patent is extended or adjusted under 35 U.S.C. 154(b) by 662 days.

(21) Appl. No.: 18/245,174

(22) PCT Filed: Sep. 17, 2021

(86) PCT No.: PCT/JP2021/034437
§ 371 (c)(1),
(2) Date: Mar. 14, 2023

(87) PCT Pub. No.: WO2022/065263
PCT Pub. Date: Mar. 31, 2022

(65) Prior Publication Data

US 2023/0365750 A1 Nov. 16, 2023

(30) Foreign Application Priority Data

Sep. 25, 2020 (JP) ................................ 2020-160712

(51) Int. Cl.
*C08G 65/333* (2006.01)

(52) U.S. Cl.
CPC .............................. *C08G 65/33341* (2013.01)

(58) Field of Classification Search
CPC ........ C08G 65/33341; C08G 65/33337; A61K 47/06
See application file for complete search history.

(56) References Cited

U.S. PATENT DOCUMENTS

| | | | |
|---|---|---|---|
| 7,790,835 | B2 | 9/2010 | McManus et al. |
| 2012/0253053 | A1 | 10/2012 | Satoshi et al. |

FOREIGN PATENT DOCUMENTS

| | | | |
|---|---|---|---|
| JP | 2012-214746 A | | 11/2012 |
| JP | 2013-534931 A | | 9/2013 |
| WO | WO 2005/056636 A2 | | 6/2005 |

OTHER PUBLICATIONS

International Search Report Issued Nov. 22, 2021, in PCT/JP2021/034437, filed on Sep. 17, 2021, 2 pages.
Warnecke et al. "Maleimide-oligo(ethylene glycol) Derivatives of Camptothecin as Albumin-Binding Prodrugs: Synthesis and Antitumor Efficacy", Bioconjugate Chem., vol. 14, No. 2, 377-387, 2003.
Extended European Search Report issued Oct. 7, 2024, in European Patent Application No. 21872392.2, 8 pages.

*Primary Examiner* — Shane Fang

(74) *Attorney, Agent, or Firm* — Oblon, McClelland, Maier & Neustadt, L.L.P.

(57) ABSTRACT

The present invention provides a method for producing a maleimide polyethylene glycol lipid, and the method includes a reaction step of deprotecting a maleimide polyethylene glycol lipid having a protective group by heating the maleimide polyethylene glycol lipid having a protective group in a solvent in the presence of silica gel. According to the present invention, a production method of preventing deterioration of a maleimide group and improving a maleimidation rate can be provided.

7 Claims, No Drawings

METHOD FOR PRODUCING MALEIMIDE POLYETHYLENE GLYCOL LIPID

CROSS REFERENCE TO RELATED APPLICATIONS

This application is a National Stage entry under 35 U.S.C. § 371 of PCT/JP2021/034437, filed on Sep. 17, 2021, and claims priority to Japanese Patent Application No. 2020-160712, filed on Sep. 25, 2020, the entire contents of which are incorporated herein by reference.

TECHNICAL FIELD

The present invention relates to a method for producing a maleimide polyethylene glycol lipid, which deprotects a protective group in a maleimide polyethylene glycol lipid having the protective group.

BACKGROUND ART

In the field of drug delivery systems, studies on lipid nanoparticles (hereinafter referred to as LNP(s)) containing nucleic acids have been widely conducted. The LNPs are fine particles composed of phospholipids, cholesterol, polyethylene glycol (PEG) lipids, and cationic lipids. A surface of the LNP is covered with PEG, and thus the LNP is useful for protection of nucleic acids to be rapidly decomposed by enzymes. Therefore, the LNP exhibits high blood retention, and further interacts with cells (hepatocytes, endothelial cells, B cells, and Kupffer cells) in the liver and accumulates therein, so that the LNP is used for nucleic acid delivery targeting hepatocytes. However, there is an example of delivery to the liver by the LNP since the LNP has such characteristics, and in order to deliver nucleic acids to a wider variety of organs, it is necessary to introduce a ligand for recognizing a receptor on a cell surface, such as an antibody, an aptamer, a peptide, and a sugar chain, into a PEG terminal on the surface of the LNP to improve targeting ability to a target organ.

PEG on the surface of the LNP is derived from a PEG lipid which is a constituent component of the LNP, so that if an active group capable of bonding a ligand can be introduced into a PEG terminal of the PEG lipid, the ligand can be immobilized on the surface of the LNP, and targeting ability to a target organ can be imparted. Therefore, it is important to select an appropriate active group that reacts with the ligand, and a thiol group in a cysteine side chain is exemplified as a reactive site in an antibody. It is known that the thiol group is likely to react with a maleimide group. Therefore, it is considered to be effective to use a maleimide PEG lipid obtained by introducing a maleimide group to the PEG terminal of the PEG lipid.

Examples of a method for producing the maleimide PEG lipid include a reaction between a 1,2-diacylglycerol derivative whose 3-position hydroxy group is substituted with an active group and a maleimide PEG derivative having a primary amine, which is described in PTL 1. In the described production method, the 3-position hydroxy group of 1,2-diacyl-glycerol is converted into an active group, and the maleimide PEG derivative having a primary amine is used to condense an amino group and the active group, so that a maleimide PEG lipid is obtained. Here, a maleimidation rate of a terminal of the PEG lipid greatly affects the introduction of a ligand into the maleimide PEG lipid. However, since the above-described maleimide PEG lipid is synthesized through two steps after introducing maleimide into a PEG derivative which is a raw material of the maleimide PEG lipid, the maleimide group high in reactivity deteriorates every time the reaction is performed, and the maleimidation rate decreases, which leads to a decrease in ligand introduction rate. Therefore, a method for directly introducing a maleimide group in a final step of the synthesis is preferred from the viewpoint of preventing the deterioration of the maleimide group.

The production method includes a reaction between a PEG derivative and maleimide, which is described in NPL 1. However, in the described production method, when maleimide reacts with a hydroxy group at a PEG terminal in the PEG derivative at −78° C. in the presence of triphenylphosphine and diisopropyl azodicarboxylate, a yield rate of the maleimide PEG derivative is 31%, and a cause of this low yield rate is not mentioned.

On the other hand, although an example of the maleimide PEG lipid is not shown, a reaction between a furan derivative and a PEG derivative using a maleimide derivative synthesized from maleimide, which is described in PTL 2, is cited as one of synthesis examples applicable to the synthesis of the maleimide PEG lipid. In the described production method, the maleimide PEG derivative is obtained by substituting a leaving group at the PEG terminal with a maleimide derivative, and then performing deprotection by heating. Although the maleimidation rate is not described in the method, it is advantageous to prevent a decrease in maleimidation rate as compared with PTL 1 since a maleimide derivative having a protective group by which a highly active double bond of maleimide is protected is used during the introduction of a maleimide group. However, it is difficult to avoid a decrease in maleimidation rate in a deprotection process.

CITATION LIST

Patent Literature

PTL 1: JP 2012-214746 A
PTL 2: U.S. Pat. No. 7,790,835

Non-Patent Literature

NPL 1: Bioconjugate Chem., vol. 14, No. 2, 377-387 (2003)

SUMMARY OF INVENTION

Technical Problem

Accordingly, an object of the present invention is to provide a method for producing a maleimide polyethylene glycol lipid by deprotecting a maleimide polyethylene glycol lipid having a protective group, by which deterioration of maleimide groups is prevented and a maleimidation rate is improved.

Solution to Problem

As a result of intensive studies, the present inventors have found that by adding silica gel to a reaction system during deprotection, a maleimide polyethylene glycol lipid is obtained while preventing deterioration of maleimide groups as compared with a method according to the related art, and have completed the present invention.

That is, the present invention relates to the following [1] to [7].

[1] A method for producing a maleimide polyethylene glycol lipid represented by the following general formula (2), the method including:

a reaction step of deprotecting a maleimide polyethylene glycol lipid having a protective group, which is represented by the following general formula (1), by heating the maleimide polyethylene glycol lipid having a protective group in a solvent in the presence of silica gel, (1)

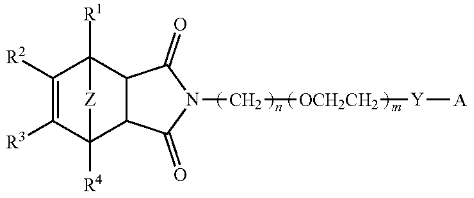

(2)

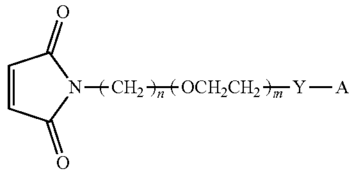

wherein $R^1$, $R^2$, $R^3$, and $R^4$ are each independently a group selected from a hydrogen atom, an alkyl group, a halogen, a cyano group, a formyl group, an acyl group, a carboxy group, an acyloxy group, and an alkylcarbonyloxymethyl group, n is an integer of 2 to 10 which represents the repeating unit number of a methylene group, m is an integer of 10 to 2000 which represents the repeating unit number of polyethylene glycol, Z represents a group selected from an ether group, a methylene group, and a dimethylvinylidene group, Y is any group represented by the following general formulas (3) to (6):

(3)

Y = —O—

(4)

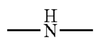

(5)

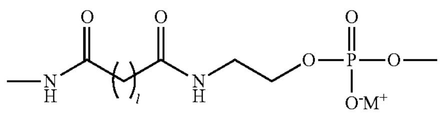

(6)

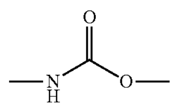

(wherein M represents Na or K, and 1 represents an integer of 1 to 5 which represents a repeating unit number of a methylene group) and A is a group represented by the following general formula (7) or (8):

(7)

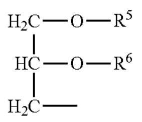

(8)

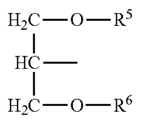

($R^5$ and $R^6$ each independently represent any group selected from a hydrogen atom, a saturated or unsaturated acyl group having 8 to 24 carbon atoms, or a saturated or unsaturated alkyl group having 8 to 24 carbon atoms).

[2] The production method according to the above [1], in which $R^1$, $R^2$, $R^3$, and $R^4$ in the general formula (1) are each independently a hydrogen atom or an alkyl group.

[3] The production method according to the above [1] or [2], in which A in the general formulas (1) and (2) is a group represented by the formula (7), and $R^5$ and $R^6$ are each independently selected from a saturated or unsaturated acyl group having 8 to 24 carbon atoms or a saturated or unsaturated alkyl group having 8 to 24 carbon atoms.

[4] The production method according to any one of the above [1] to [3], in which Y in the general formulas (1) and (2) is a group represented by the formula (3).

[5] The production method according to any one of [1] to [4], in which n in the general formulas (1) and (2) is an integer of 2 to 6.

[6] The production method according to any one of the above [1] to [5], in which n in the general formulas (1) and (2) is 2.

[7] The production method according to any one of the above [1] to [6], in which m in the general formulas (1) and (2) is an integer of 20 to 150.

Advantageous Effects of Invention

According to the present invention, a method for producing a maleimide polyethylene glycol lipid having a high introduction rate of maleimide groups can be provided.

DESCRIPTION OF EMBODIMENTS

Hereinafter, an embodiment of the present invention will be described in detail.

A method for producing a maleimide polyethylene glycol lipid according to the present invention is a method for producing a maleimide polyethylene glycol lipid represented by the following general formula (2). The method includes a reaction step of deprotecting a maleimide polyethylene glycol lipid having a protective group, which is represented by the following general formula (1), by heating the maleimide polyethylene glycol lipid having a protective group in a solvent in the presence of silica gel.

The above-described maleimide polyethylene glycol lipid having a protective group may be referred to as a "maleimide PEG lipid having a protective group" or "compound 1". The above-described maleimide polyethylene glycol lipid may be referred to as a "maleimide PEG lipid" or "compound 2".

(1)

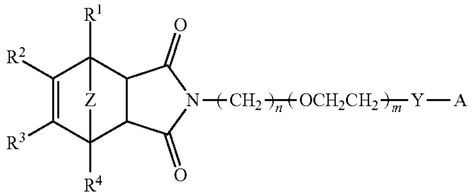

(2)

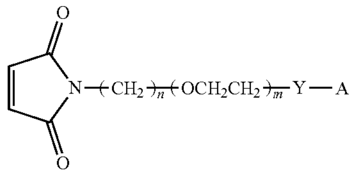

[In the formulas, $R^1$, $R^2$, $R^3$, and $R^4$ each independently represent any group selected from a hydrogen atom, an alkyl group, a halogen, a cyano group, a formyl group, an acyl group, a carboxy group, an acyloxy group, and an alkylcarbonyloxymethyl group. n is an integer of 2 to 10 which represents the repeating unit number of a methylene group. m is an integer of 10 to 2000 which represents the repeating unit number of polyethylene glycol. Z represents any group selected from an ether group, a methylene group, and a dimethylvinylidene group. Y is any group represented by the following general formulas (3) to (6).

Y = —O— (3)

(4)

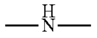

(5)

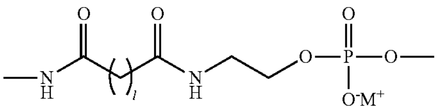

(6)

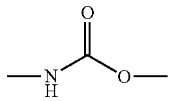

(In the formula (5), M represents Na or K, and 1 represents an integer of 1 to 5 which represents a repeating unit of a methylene group.)

A is a group represented by the following general formula (7) or (8).

(7)

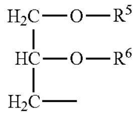

(8)

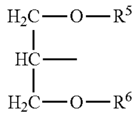

($R^5$ and $R^6$ each independently represent any group selected from a hydrogen atom, a saturated or unsaturated acyl group having 8 to 24 carbon atoms, or a saturated or unsaturated alkyl group having 8 to 24 carbon atoms.)]

[Maleimide PEG Lipid Having Protective Group Represented by General Formula (1)]

In the production method according to the present invention, the maleimide PEG lipid having a protective group, which is represented by the general formula (1), is used as a raw material.

(1)

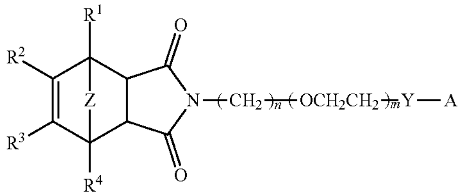

$R^1$, $R^2$, $R^3$, and $R^4$ in the formula (1) each independently represent any group selected from a hydrogen atom, an alkyl group, a halogen, a cyano group, a formyl group, an acyl group, a carboxy group, an acyloxy group, and an alkylcarbonyloxymethyl group.

Among them, it is preferable that $R^1$, $R^2$, $R^3$, and $R^4$ are each independently a hydrogen atom, or an alkyl group having 1 to 5 carbon atoms. Among them, it is particularly preferable that $R^1$, $R^2$, $R^3$, and $R^4$ are hydrogen atoms, or $R^2$, $R^3$, and $R^4$ are hydrogen atoms and $R^1$ is a methyl group, or $R^1$, $R^2$ and $R^3$ are hydrogen atoms and $R^4$ is a methyl group, or $R^2$ and $R^3$ are hydrogen atoms and $R^1$ and $R^4$ are methyl groups.

n in the formula (1) represents the repeating unit number of a methylene group, and is an integer of 2 to 10. n is preferably an integer of 2 to 6, and more preferably 2.

m in the formula (1) represents the repeating unit number of polyethylene glycol, and is an integer of 10 to 2000. m is preferably an integer of 20 to 150, and more preferably an integer of 40 to 50. When m is equal to or more than a lower limit of the above-described numerical ranges, the blood retention of LNP is improved, and when m is equal to or less than an upper limit of the above-described numerical ranges, the ligand introduction rate is improved.

Z in the formula (1) represents any group selected from an ether group, a methylene group, and a dimethylvinylidene group. Among them, Z is preferably an ether group (that is, an oxygen atom) from the viewpoint of ease of protection and deprotection of maleimide.

Y in the formula (1) is any group represented by the following general formulas (3) to (6).

Y = —O— (3)

(4)

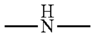

(5)

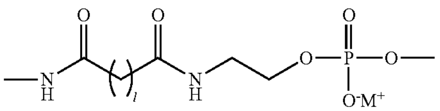

(6)

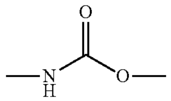

In the formula (5), M represents Na or K, and 1 is an integer of 1 to 5 which represents a repeating unit of a methylene group. In each of the groups represented by the formulas (3) to (6), "—" at both ends represents a bond.

From the viewpoint of ease of production, Y is preferably a group represented by the formula (3) (that is, an oxygen atom) among the above groups.

A in the formula (1) is a group represented by the following general formula (7) or (8). Among them, A is preferably a group represented by the formula (7).

(7)

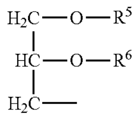

(8)

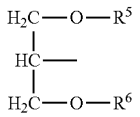

$R^5$ and $R^6$ each independently represent any group selected from a hydrogen atom, a saturated or unsaturated acyl group having 8 to 24 carbon atoms, or a saturated or unsaturated alkyl group having 8 to 24 carbon atoms. Among them, a saturated or unsaturated acyl group having 8 to 24 carbon atoms, or a saturated or unsaturated alkyl group having 8 to 24 carbon atoms is preferred, and a saturated or unsaturated acyl group having 8 to 24 carbon atoms is particularly preferred. "—" in a carbon atom shown at the bottom of the formula (7) and "—" in a carbon atom in the middle of the formula (8) each represent a bond, specifically, a bond to be bonded to Y in the formula (1).

In $R^5$ and $R^6$, the saturated or unsaturated acyl group having 8 to 24 carbon atoms is represented by the following formula (9).

(9)

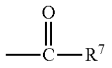

In the formula (9), $R^7$ is a saturated or unsaturated hydrocarbon group having 7 to 23 carbon atoms, and the hydrocarbon group may be linear or branched. $R^7$ is preferably a saturated and linear hydrocarbon group having 10 to 22 carbon atoms, and particularly preferably a saturated and linear hydrocarbon group having 16 to 18 carbon atoms.

In $R^5$ and $R^6$, the saturated or unsaturated alkyl group having 8 to 24 carbon atoms is linear or branched. The saturated or unsaturated alkyl group is preferably a saturated and linear alkyl group having 10 to 22 carbon atoms, and more preferably a saturated and linear alkyl group having 17 to 19 carbon atoms.

The method for producing the maleimide PEG lipid having a protective group, which is represented by the general formula (1), is not particularly limited, and the maleimide PEG lipid can be obtained, for example, by preparing the following maleimide protection product (formula (10)) and PEG lipid (formula (11)) and causing a reaction therebetween. In the maleimide protection product and the PEG lipid, $R^1$, $R^2$, $R^3$, $R^4$, Z, n, m, Y, and A have the same meanings as those in the general formula (1).

(10)

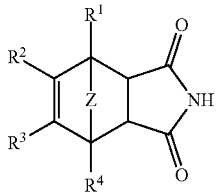

(11)

$$HO{-}(CH_2)_n{-}(OCH_2CH_2)_m{-}Y{-}A$$

The maleimide protection product is obtained, for example, by Diels-Alder reaction between maleimide and a five-membered ring compound such as furan or furan having a substituent.

The above-described PEG lipid is preferably obtained by: using a compound which is produced using, for example, 1,2-isopropylidene glycerol as a raw material and in which the 3-position hydroxy group of 1,2-isopropylidene glycerol is modified with polyethylene glycol; protecting a hydroxy group at the PEG terminal with a benzyl group; deprotecting isopropylidene; and then, modifying the remaining two hydroxy groups of the compound with an acyl group or an alkyl group to perform debenzylation.

[Method for Producing Maleimide PEG Lipid Represented by General Formula (2)]

The method for producing the maleimide PEG lipid represented by the following general formula (2) according to the present invention is a production method including a reaction step of deprotecting the maleimide PEG lipid having a protective group, which is represented by the above general formula (1), by heating the maleimide PEG lipid having a protective group in a solvent in the presence of silica gel.

(2)

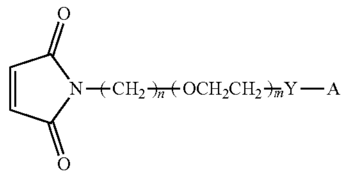

In the formula (2), n, m, Y, and A have the same meanings as those in the formula (1).

The silica gel used in the production method according to the present invention is spherical or crushed silicon dioxide.

An average particle diameter of the silica gel is not particularly limited, and is preferably 5 μm to 425 μm, and more preferably 50 μm to 150 μm.

An average pore diameter of the silica gel is not particularly limited, and is preferably 2 nm to 15 nm, and more preferably 6 nm to 13 nm.

A pore volume of the silica gel is not particularly limited, and is preferably 0.5 mL/g to 1.5 mL/g, and more preferably 0.6 mL/g to 1.2 mL/g.

A specific surface area of the silica gel is not particularly limited, and is preferably 200 $m^2/g$ to 800 $m^2/g$, and more preferably 250 $m^2/g$ to 550 $m^2/g$.

When the average particle diameter, the average pore diameter, the pore volume, and the specific surface area are equal to or more than corresponding lower limits of the above numerical ranges, it is effective to the deprotection reaction. When the average particle diameter, the average pore diameter, the pore volume, and the specific surface area are equal to or less than corresponding upper limits of the above numerical ranges, an amount of a target substance extracted from a filtrate is increased after the silica gel is separated by filtration, and the productivity is improved.

The average particle diameter of the silica gel is a value measured by a laser diffraction particle size distribution measurement method. The average pore diameter, the pore volume, and the specific surface area of the silica gel are values measured by a nitrogen gas adsorption method. In addition, the specific surface area is a value calculated using a BET equation.

An amount of the silica gel used is preferably 0.1 to 5 times by weight, and particularly preferably 1 to 3 times by weight with respect to the maleimide PEG lipid (compound 1) having a protective group represented by the general formula (1). When the amount of the silica gel used is equal to or more than the lower limit, the deterioration of the maleimide group can be prevented. When the amount of the silica gel used is equal to or less than the upper limit, a reaction solution is easy to be stirred.

In the present invention, the deprotection reaction is carried out by heating in a solvent. The temperature of the solvent during heating in the present invention (that is, the reaction temperature) is preferably 70° C. to 150° C., and particularly preferably 100° C. to 120° C. When the temperature of the solvent is equal to or higher than the lower limit, the reaction easily proceeds, and when the temperature is equal to or lower than the upper limit, the deterioration of maleimide can be prevented.

The solvent used in the present invention is not particularly limited as long as it is aprotic and has a boiling point equal to or higher than the reaction temperature, and toluene and p-xylene are preferred. An amount of the solvent used is preferably 3 to 50 times by weight, and more preferably 5 to 20 times by weight with respect to the maleimide PEG lipid (compound 1) having a protective group represented by the general formula (1). When the amount of the solvent used is equal to or more than the lower limit, the reaction solution is easy to be stirred, and when the amount of the solvent used is equal to or less than the upper limit, economic efficiency is increased.

The reaction time in the present invention varies depending on the kinds and the amounts of the raw materials and the solvent used, and is generally 2 hours to 8 hours.

EXAMPLES

Hereinafter, the present invention will be described in more detail with reference to Examples. In Examples, NMR was used for the analysis of the maleimidation rate.

<$^1$H-NMR Analysis Method>

In the analysis using the 1H-NMR analysis method, JNM-ECP400 and JNM-ECA600 manufactured by JEOL Ltd. were used. An integrated value of NMR measurement values is a theoretical value.

A maleimide PEG lipid (B) having a protective group was produced by the following Production Examples (1-1) to (1-5).

(B)

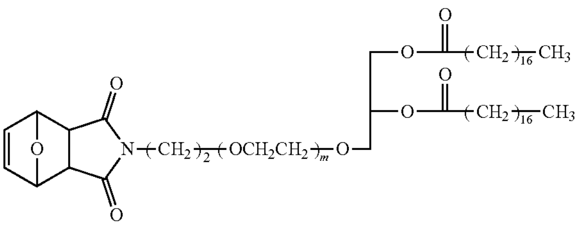

m = 45

Production Example 1-1

Synthesis of Maleimide Protection Product (A)

To a screw tube, 157.1 mg (1.61 mmol) of maleimide, 1.5 g of methyl t-butyl ether, and 876.7 mg (12.88 mmol) of furan were added, followed by stirring at 30° C. for 8 hours in a nitrogen atmosphere. The resultant product was allowed to stand to cool until to room temperature, and precipitated crystals were collected by filtration and vacuum-dried to obtain the following maleimide protection product (A) (122.9 mg, 0.74 mmol).

(A)

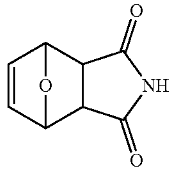

Production Example 1-2

Benzyl Protection and Deisopropylidene Step for Isopropylidene Glycerol PEG

To a 2 L round-bottom flask equipped with a thermometer, a nitrogen blowing tube, a stirrer, and a cooling tube, 100 g (47.3 mmol) of isopropylidene glycerol PEG, 10.6 g (94.6 mmol) of potassium t-butoxide, and 1000 g of toluene were charged, and the mixture was stirred at room temperature for 10 minutes while blowing nitrogen into the flask. Thereafter, 12.0 g (94.8 mmol) of benzyl chloride was charged thereto, followed by stirring at 80° C. for 2 hours. After cooling to room temperature, 1930 g of a phosphoric acid aqueous solution having a pH of 1.4 was added thereto, and stirring was performed for 20 minutes. After standing and layering, the toluene layer as an upper layer was discarded, 15 g of 85% phosphoric acid was added such that the aqueous solution had a pH of 1.5, and stirring was performed at room temperature for 2 hours. 50 g of a 400 g/L NaOH aqueous solution was added to adjust the pH to 6.8, and 300 g of sodium chloride was added and dissolved. Thereafter, 33.9 g of a 400 g/L NaOH aqueous solution was added to adjust the pH to 7.1. 300 g of chloroform was added thereto, and stirring was performed for 20 minutes, followed by standing and layering, and then the chloroform layer as a lower layer was extracted. Thereafter, the same extraction was repeated twice, and chloroform layers obtained from the first to third extraction were concentrated at 40° C. using a rotary evaporator. Thereafter, 400 g of ethyl acetate was added to prepare a solution, and 30 g of magnesium sulfate was added to perform dehydration. Magnesium sulfate was filtered by pressure filtration, followed by performing washing with 200 g of ethyl acetate, and the obtained filtrate was cooled to 5° C. or lower. 400 g of hexane was added thereto to perform reprecipitation, and the precipitated crystal was collected by pressure filtration and vacuum-dried to obtain the following glycerol benzyl-protected PEG (C) (94 g, 43.48 mmol).

(C)

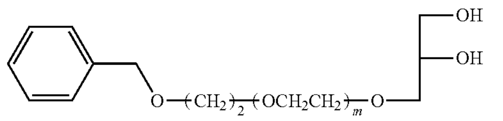

m = 45

Production Example 1-3

Diacylation Step for Glycerol Benzyl-Protected PEG

To a 1 L round-bottom flask equipped with a thermometer, a nitrogen blowing tube, a stirrer, and a cooling tube, 50 g (23.1 mmol) of the glycerol benzyl-protected PEG (C), 26.3 g (92.5 mmol) of stearic acid, and 200 g of toluene were charged, and the mixture was stirred at 40° C. while blowing nitrogen into the flask, thereby preparing a solution. 19.1 g (92.5 mmol) of N,N'-dicyclohexylcarbodiimide and 1.13 g (9.25 mmol) of 4-dimethylaminopyridine were added thereto, and stirring was performed at 60° C. for 3 hours. The precipitate was filtered by suction filtration, and the filtrate was concentrated at 50° C. using a rotary evaporator. 150 g of acetonitrile and 300 g of hexane were added to prepare a solution, and the hexane layer as an upper layer was discarded. Thereafter, 200 g of hexane was added, and stirring was performed at 50° C. for 30 minutes, followed by hexane washing in which the hexane layer as the upper layer was discarded. Thereafter, the same hexane washing was repeated three times, 150 g of acetonitrile was added to the acetonitrile layer, 10 g of KYOWAAD 700 (manufactured by Kyowa Chemical Industry Co., Ltd.) and 10 g of KYOWAAD 1000 (manufactured by Kyowa Chemical Industry Co., Ltd.) were added thereto, and stirring was performed at room temperature for 30 minutes. Thereafter, KYOWAAD 700 and KYOWAAD 1000 were filtered by suction filtration, the thus-obtained filtrate was concentrated at 50° C., followed by vacuum-drying, to obtain the following benzyl-protected PEG lipid (D) (55.4 g, 20.56 mmol).

(D)

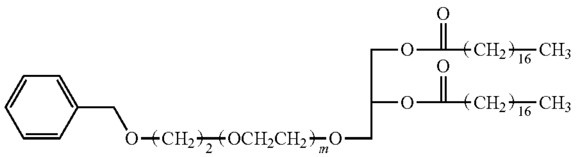

m = 45

Production Example 1-4

Debenzylation Step for Benzyl-Protected PEG Lipid

To a 1 L round-bottom flask equipped with a thermometer, a nitrogen blowing tube, a stirrer, and a cooling tube, 53 g (19.7 mmol) of the benzyl-protected PEG lipid (D), 26.5 g of 5% Pd/C, 422.1 g of methanol, and 71.9 g of cyclohexene were charged, and the mixture was stirred at 55° C. for 2 hours while blowing nitrogen into the flask. After allowing the resultant product to stand to cool until 30° C., 5% Pd/C was filtered by pressure filtration using KYOWAAD 300 (manufactured by Kyowa Chemical Industry Co., Ltd.) as a filter aid, followed by washing with 318 g of chloroform four times. To the filtrate, 0.053 g of dibutylhydroxytoluene was added, followed by concentration at 55° C. using a rotary evaporator, and a solution was prepared with 424 g of ethyl acetate. 26.5 g of magnesium sulfate was added to perform dehydration, and suction filtration was performed, followed by washing with 106 g of ethyl acetate. The obtained filtrate was cooled to 5° C. or lower, and 954 g of methyl tert-butyl ether was added to perform reprecipitation. The precipitated crystal was collected by filtration and vacuum-dried to obtain the following PEG lipid (E) (42.2 g, 16.20 mmol).

(E)

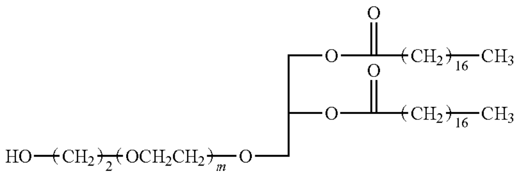

m = 45

Production Example 1-5

To a 500 mL round-bottom flask equipped with a thermometer, a nitrogen blowing tube, a stirrer, and a cooling tube, 18.0 g (6.86 mmol) of the PEG lipid (E), 45 g of dehydrated toluene, 180 g of chloroform, 1.36 g (8.23 mmol) of the maleimide protection product (A), and 9.00 g (34.3 mmol) of triphenylphosphine were charged, and the mixture was stirred at room temperature while blowing nitrogen into the flask, thereby preparing a solution. The solution was cooled to 10° C., and then, diisopropyl azodicarboxylate (34.3 mmol) was added thereto, followed by stirring at room temperature for 1 hour. 1.0 g (34.3 mmol) of methanol was added, followed by concentration at 50° C. The concentrate was purified by column chromatography using silica gel (PSQ100B). The impurities were eluted with hexane/ethyl acetate=20/80, and a target substance was eluted with chloroform/methanol=95/5. The fraction containing the target substance was concentrated and vacuum-dried to obtain the following maleimide PEG lipid (B) having a protective group (18.0 g, 6.49 mmol).

(B)

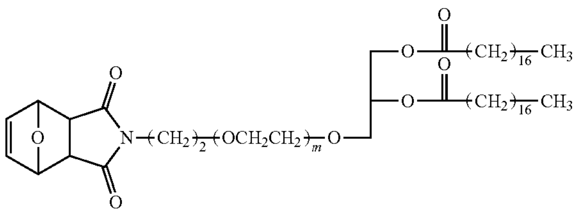

m = 45

A maleimide PEG lipid (F) having a protective group was produced by the following Production Examples (2-1) and (2-2).

(F)

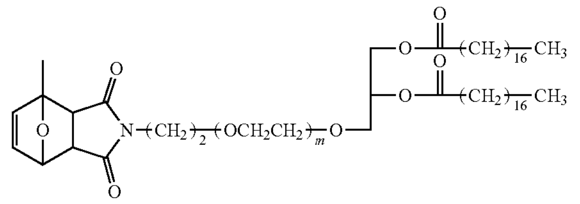

m = 45

Production Example 2-1

Synthesis of Maleimide Protection Product (G)

To a screw tube, 157.1 mg (1.61 mmol) of maleimide, 1.5 g of methyl t-butyl ether, and 877.7 mg (12.89 mmol) of 2-methylfuran were added, followed by stirring at 30° C. for 8 hours in a nitrogen atmosphere. The resultant product was cooled to room temperature, and the precipitated crystals were collected by filtration and vacuum-dried to obtain the following maleimide protection product (G) (483.1 mg, 0.48 mmol).

(G)

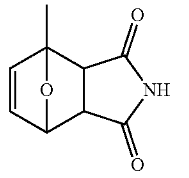

m = 45

Production Example 2-2

Step of Introducing Maleimide Protection Product (G) into PEG Lipid

To a 9 mL screw tube, 100.0 mg (0.0381 mmol) of the PEG lipid (E), 0.25 g of dehydrated toluene, 1.0 g of chloroform, 11.2 mg (0.0580 mmol) of the maleimide protection product (G), and 50.6 mg (0.193 mmol) of triphenylphosphine were charged, and the mixture was stirred at room temperature while blowing nitrogen into the tube, thereby preparing a solution. The solution was cooled to 10° C., and then, 41.3 mg (0.204 mmol) of diisopropyl azodicarboxylate was added, followed by stirring at room temperature for 1 hour. 1.0 g (34.3 mmol) of methanol was added, followed by concentration at 50° C. The concentrate was purified by column chromatography using silica gel (PSQ100B). The impurities were eluted with hexane/ethyl acetate=20/80, and a target substance was eluted with chloroform/methanol=95/5. The fraction containing the target substance was concentrated and vacuum-dried to obtain the following maleimide PEG lipid (F) having a protective group (96.3 mg, 0.0346 mmol).

(F)

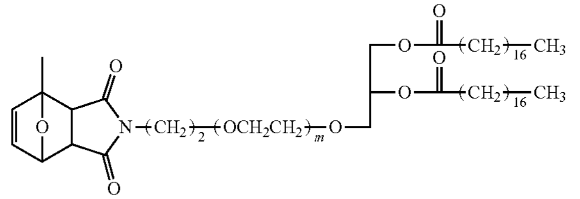

m = 45

A maleimide PEG lipid (H) having a protective group was produced by the following Production Examples (3-1) and (3-2).

(H)

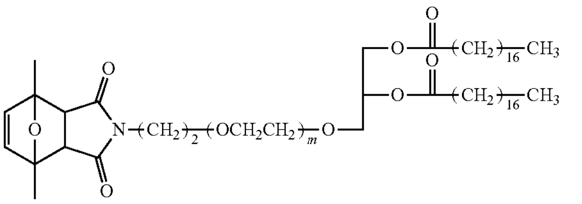

m = 45

Production Example 3-1

Synthesis of Maleimide Protection Product (I)

To a screw tube, 386.9 mg (3.99 mmol) of maleimide, 3.7 g of methyl t-butyl ether, and 3.09 mg (32.14 mmol) of 2,5-dimethylfuran were added, and the mixture was stirred at 50° C. for 8 hours in a nitrogen atmosphere. The resultant product was allowed to stand to cool until room temperature, and the precipitated crystals were collected by filtration and vacuum-dried to obtain the following maleimide protection product (I) (522.3 mg, 2.70 mmol).

(I)

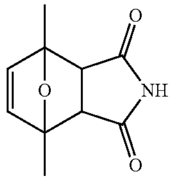

Production Example 3-2

Step of Introducing Maleimide Protection Product (I) into PEG Lipid (E)

To a 9 mL screw tube, 151 mg (0.0575 mmol) of the PEG lipid (E), 0.37 g of dehydrated toluene, 1.5 g of chloroform, 12.2 mg (0.0680 mmol) of the maleimide protection product (I), and 74.6 mg (0.284 mmol) of triphenylphosphine were charged, and the mixture was stirred at room temperature while blowing nitrogen into the tube, thereby preparing a solution. The solution was cooled to 10° C., and then, 61.0 mg (0.302 mmol) of diisopropyl azodicarboxylate was added, followed by stirring at room temperature for 1 hour. 27.5 mg (0.859 mmol) of methanol was added, followed by concentration at 50° C. The concentrate was purified by column chromatography using silica gel (PSQ100B). The impurities were eluted with hexane/ethyl acetate=20/80, and a target substance was eluted with chloroform/methanol=95/5. The fraction containing the target substance was concentrated and vacuum-dried to obtain the following maleimide PEG lipid (H) having a protective group (143.5 mg, 0.0515 mmol).

(H)

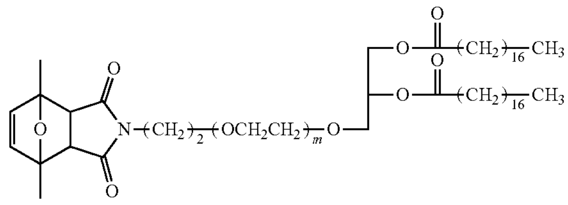

m = 45

Example 1

Method for Producing Maleimide PEG Lipid

To a 100 mL branched test tube, 150 mg (0.0554 mmol) of the maleimide PEG lipid (B) having a protective group, 1.5 g of toluene, and 150 mg of silica gel (PSQ100B, manufactured by Fuji Silysia Chemical Ltd.) were added, and the mixture was stirred at 110° C. for 5 hours in a nitrogen atmosphere. After a reaction solution was decanted, a target substance was extracted twice from the silica gel with 3 g of methanol. The reaction solution and the extracted solution were transferred to a 50 mL eggplant flask, and were concentrated and dried. Thereafter, vacuum drying was performed for 6 hours to obtain a maleimide PEG lipid (J) (yield: 135.3 mg, 0.0512 mmol, yield rate: 92%, maleimidation rate: 98%). Note that the silica gel (PSQ100B, manufactured by Fuji Silysia Chemical Ltd.) used in this Example has an average particle diameter of 100 μm, an average pore diameter of 7 nm, a pore volume of 0.8 mL/g, and a specific surface area of 500 $m^2/g$.

(J)

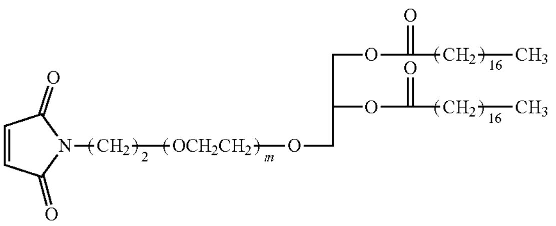

m = 45

According to $^1H$-NMR of the maleimide PEG lipid (J) obtained in Example 1, peaks derived from the maleimide PEG lipid (B) having a protective group were not present at 6.51 ppm and 6.42 ppm, and thus, it was found that deprotection was completed. In addition, an integrated value of a peak at 6.71 ppm derived from vinyl protons of the maleimide group was 1.96, and thus, it was confirmed that the target maleimide PEG lipid (J) represented by the formula (2) was obtained at a maleimidation rate of 98%.

Example 21

Method for Producing Maleimide PEG Lipid

To a 100 mL branched test tube, 100 mg (0.0359 mmol) of the maleimide PEG lipid (F) having a protective group, 1.0 g of toluene, and 100 mg of silica gel (PSQ100B, manufactured by Fuji Silysia Chemical Ltd.) were added, and the mixture was stirred at 110° C. for 5 hours in a nitrogen atmosphere. After a reaction solution was decanted, a target substance was extracted twice from the silica gel with 2 g of methanol. The reaction solution and the extracted solution were transferred to a 50 mL eggplant flask, and were concentrated and dried. Thereafter, vacuum drying was performed for 6 hours to obtain a maleimide PEG lipid (J) (yield: 91.0 mg, 0.0327 mmol, yield rate: 91%, maleimidation rate: 98%)

Note that the silica gel (PSQ100B, manufactured by Fuji Silysia Chemical Ltd.) used in this Example has an average particle diameter of 100 μm, an average pore diameter of 7 nm, a pore volume of 0.8 mL/g, and a specific surface area of 500 $m^2/g$.

According to $^1H$-NMR of the maleimide PEG lipid (J) obtained in Example 2, peaks derived from the maleimide PEG lipid (F) having a protective group were not present at 6.55 ppm, 6.41 ppm, 6.35 ppm, and 6.24 ppm, and thus, it was found that deprotection was completed. In addition, an integrated value of a peak at 6.71 ppm derived from vinyl protons of the maleimide group was 1.96, and thus, it was confirmed that the target maleimide PEG lipid (J) represented by the formula (2) was obtained at a maleimidation rate of 98%.

Example 3

Method for Producing Maleimide PEG Lipid

To a 100 mL branched test tube, 100 mg (0.0357 mmol) of the maleimide PEG lipid (H) having a protective group, 1.0 g of toluene, and 100 mg of silica gel (PSQ100B, manufactured by Fuji Silysia Chemical Ltd.) were added, and the mixture was stirred at 110° C. for 5 hours in a nitrogen atmosphere. After a reaction solution was decanted, a target substance was extracted twice from the silica gel with 2 g of methanol. The reaction solution and the extracted solution were transferred to a 50 mL eggplant flask, and were concentrated and dried. Thereafter, vacuum drying was performed for 6 hours to obtain a maleimide PEG lipid (J) (yield: 88.7 mg, 0.0336 mmol, yield rate: 94%, maleimidation rate: 99%). Note that the silica gel (PSQ100B, manufactured by Fuji Silysia Chemical Ltd.) used in this Example has an average particle diameter of 100 μm, an average pore diameter of 7 nm, a pore volume of 0.8 mL/g, and a specific surface area of 500 $m^2/g$.

According to $^1$H-NMR of the maleimide PEG lipid (J) obtained in Example 3, peaks derived from the maleimide PEG lipid (H) having a protective group were not present at 6.23 ppm and 6.35 ppm, and thus, it was found that deprotection was completed. In addition, an integrated value of a peak at 6.71 ppm derived from vinyl protons of the maleimide group was 1.98, and thus, it was confirmed that the target maleimide PEG lipid (J) represented by the formula (2) was obtained at a maleimidation rate of 99%.

Comparative Example 1

Method for Producing Maleimide PEG Lipid

To a 300 mL three-neck round-bottom flask, 12 g (4.4 mmol) of the maleimide PEG lipid (B) having a protective group and 120 g of toluene were added, and the mixture was stirred at 110° C. for 5 hours in a nitrogen atmosphere. A reaction solution was transferred to a 300 mL eggplant flask, and was concentrated and dried. Thereafter, vacuum drying was performed for 6 hours to obtain a maleimide PEG lipid (J) (yield: 11.73 g, 4.4 mmol, yield rate: 100%, maleimidation rate: 89%).

According to $^1$H-NMR of the maleimide PEG lipid (J) obtained in Comparative Example 1, a peak derived from the maleimide PEG lipid (B) having a protective group was not present within a range of 6.51 ppm and 6.42 ppm, and thus, it was found that deprotection was completed. In addition, an integrated value of a peak at 6.71 ppm derived from vinyl protons of the maleimide group was 1.78, and thus, it was confirmed that the target maleimide PEG lipid (J) represented by the formula (2) was obtained at a maleimidation rate of 89%.

Comparative Example 2

Method for Producing Maleimide PEG Lipid

To a 100 mL branched test tube, 150 mg (0.0554 mmol) of the maleimide PEG lipid (B) having a protective group, 1.5 g of toluene, and 150 mg of KYOWAAD 2000 (aluminum oxide-magnesium oxide solid solution, manufactured by Kyowa Chemical Industry Co., Ltd.) were added, and the mixture was stirred at 110° C. for 5 hours in a nitrogen atmosphere. After a reaction solution was decanted, a target substance was extracted twice with 3 g of methanol. The reaction solution and the extracted solution were transferred to a 50 mL eggplant flask, and were concentrated and dried. Thereafter, vacuum drying was performed for 6 hours to obtain a maleimide PEG lipid (J) (yield: 89.1 mg, 0.0337 mmol, yield rate: 61%, maleimidation rate: 65%).

According to $^1$H-NMR of the maleimide PEG lipid (J) obtained in Comparative Example 2, a peak derived from maleimide PEG lipid (B) having a protective group was not present within the range of 6.51 ppm and 6.42 ppm, and thus, it was found that deprotection was completed. In addition, an integrated value of a peak at 6.71 ppm derived from vinyl protons of the maleimide group was 1.30, and thus, it was confirmed that the target maleimide PEG lipid (J) represented by the formula (2) was obtained at a maleimidation rate of 65%.

As described above, a method for producing a maleimide polyethylene glycol lipid in a high maleimidation rate can be provided by heating a maleimide polyethylene glycol lipid having a protective group in a solvent in the presence of silica gel.

The invention claimed is:

1. A method for producing a maleimide polyethylene glycol lipid represented by the following general formula (2), the method comprising:

a reaction step of deprotecting a maleimide polyethylene glycol lipid having a protective group, which is represented by the following general formula (1), by heating the maleimide polyethylene glycol lipid having a protective group in a solvent in the presence of silica gel, (1)

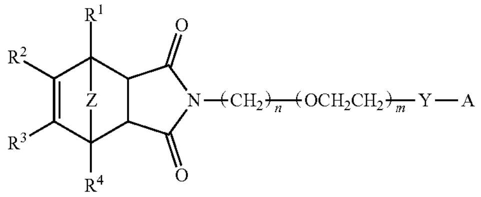

(2)

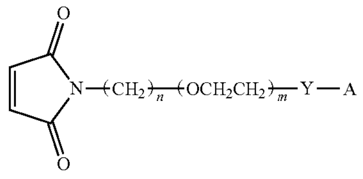

wherein $R^1$, $R^2$, $R^3$, and $R^4$ are each independently a group selected from a hydrogen atom, an alkyl group, a halogen, a cyano group, a formyl group, an acyl group, a carboxy group, an acyloxy group, and an alkylcarbonyloxymethyl group, n is an integer of 2 to 10 which represents a repeating unit number of a methylene group, m is an integer of 10 to 2000 which represents a repeating unit number of polyethylene glycol, Z represents a group selected from an ether group, a methylene group, and a dimethylvinylidene group, Y is any group represented by the following general formulas (3) to (6):

(3)

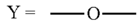

(4)

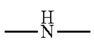

(5)

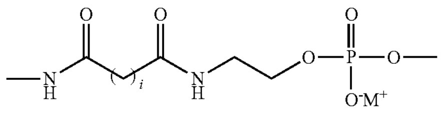

(6)

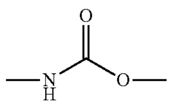

wherein M represents Na or K, and l represents an integer of 1 to 5 which represents a repeating unit number of a methylene group, and A is a group represented by the following general formula (7) or (8):

(7)

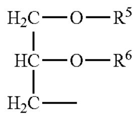

(8)

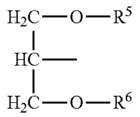

wherein $R^5$ and $R^6$ are each independently a group selected from a hydrogen atom, a saturated or unsaturated acyl group having 8 to 24 carbon atoms, or a saturated or unsaturated alkyl group having 8 to 24 carbon atoms.

2. The production method according to claim 1, wherein $R^1$, $R^2$, $R^3$, and $R^4$ in the general formula (1) are each independently a hydrogen atom or an alkyl group.

3. The production method according to claim 1, wherein A in the general formulas (1) and (2) is a group represented by the formula (7), and $R^5$ and $R^6$ are each independently selected from a saturated or unsaturated acyl group having 8 to 24 carbon atoms or a saturated or unsaturated alkyl group having 8 to 24 carbon atoms.

4. The production method according to claim 1, wherein Y in the general formulas (1) and (2) is a group represented by the formula (3).

5. The production method according to claim 1, wherein n in the general formulas (1) and (2) is an integer of 2 to 6.

6. The production method according to claim 1, wherein n in the general formulas (1) and (2) is 2.

7. The production method according to claim 1, wherein m in the general formulas (1) and (2) is an integer of 20 to 150.

* * * * *